Sept. 12, 1939.  F. MARTINDELL  2,172,770
WINDING MACHINE
Filed June 18, 1937
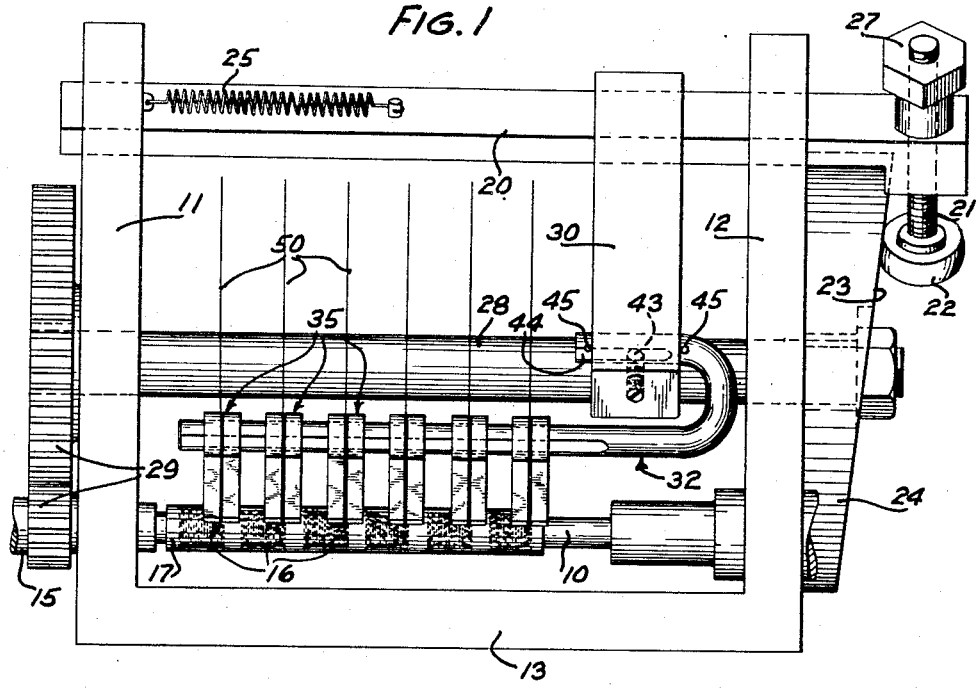
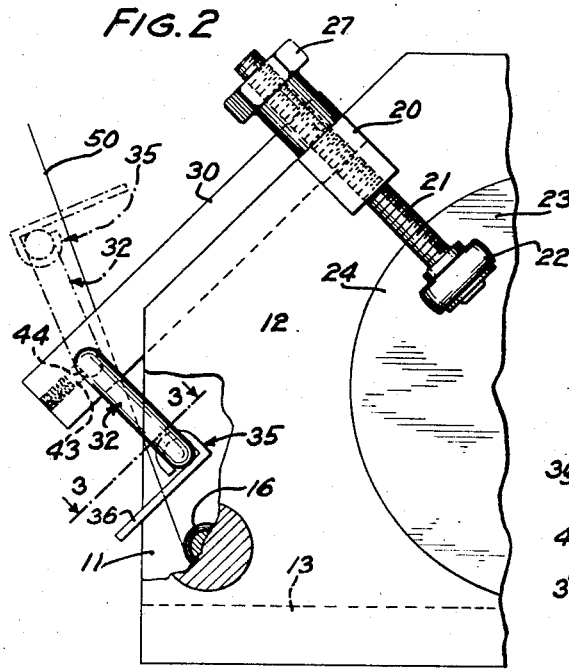
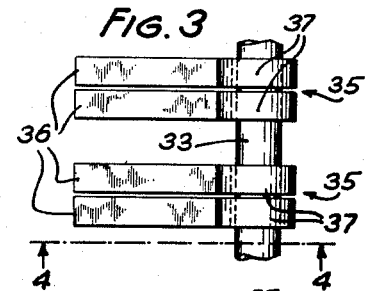
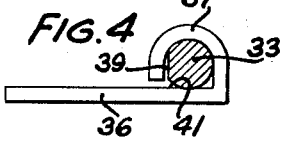
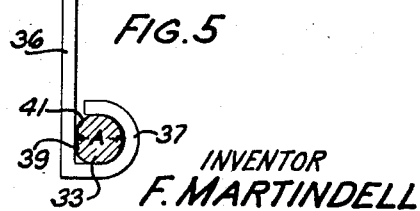
INVENTOR
F. MARTINDELL
BY Emery Robinson
ATTORNEY Patented Sept. 12, 1939

2,172,770

UNITED STATES PATENT OFFICE 2,172,770

WINDING MACHINE

Frank Martindell, Western Springs, Ill., assignor to Western Electric Company, Incorporated, New York, N. Y., a corporation of New York Application June 18, 1937, Serial No. 148,876

7 Claims. (Cl. 242—9)

This invention relates to machines for winding strand material, and more particularly to wire guiding and distributing mechanism for coil winding machines.

An object of the invention is to provide a simple, inexpensive and readily adjustable strand guide and distributor for winding machines.

In accordance with one embodiment of the invention, there is provided in a machine for winding electrical coils, a wire guide and distributor comprising a pair of metallic fingers each having a resilient loop portion for clamping engagement with a traverse rod mounted for movement longitudinally of the winding arbor of the machine. The traverse rod is of such cross section and the loop portions of the guide fingers are so shaped that they firmly grip the rod under their own spring tension, except when the fingers are rotated to a certain angular position on the rod wherein the fingers are freely movable longitudinally of the rod and are thereby readily adjustable longitudinally of the winding arbor.

Other features and advantages of the invention will become apparent from the following detailed description when read in conjunction with the accompanying drawing, in which Fig. 1 is a front elevational view of a coil winding machine equipped with a wire guiding and distributing mechanism embodying the invention;

Fig. 2 is a fragmentary end elevational view looking from the right of Fig. 1;

Fig. 3 is an enlarged fragmentary section on line 3—3 of Fig. 2, showing a plan view of two adjacent pairs of the wire guiding fingers;

Fig. 4 is a detail section on line 4—4 of Fig. 3, showing one of the wire guiding fingers in clamped position on the supporting rod, and Fig. 5 is a detail section similar to Fig. 4, but with the wire guiding finger rotated about 90° to a position in which it is loose on the supporting rod and free to be moved longitudinally thereof.

Referring now to the drawing, wherein like reference characters designate corresponding parts in the several views, there is shown in Figs. 1 and 2 a coil winding machine comprising a rotatable winding arbor 10 suitably mounted between spaced vertical frame members 11 and 12 which are rigidly interconnected by a base plate 13. The arbor is connected at one end to a shaft 15 driven from a suitable source of power (not shown) whereby the arbor is rotated at the desired speed.

The machine illustrated is adapted to wind simultaneously on spaced portions of the arbor a plurality of so-called "paper filled" coils 16, in which the superimposed layers of windings are separated by strips or sheets 17 of insulating material. The present invention, however, is not limited to machines of the type illustrated but is equally applicable for use in machines for winding one coil at a time.

In accordance with a preferred construction, the machine illustrated in the drawing further comprises a reciprocating carriage or bar 20 slidably mounted in the frame members 11 and 12. A stud 21 is threaded in one end of the bar 20 and carries a roller 22 which is adapted to engage a cam surface 23 on the face of a cam 24. A coil spring 25 holds the roller in contact with the cam surface, one end of the spring being fastened to the bar 20 and the opposite end to the frame member 11. The cam surface is designed to produce one complete reciprocation of the bar 20 for each revolution of the cam. The extent of movement of the bar may be varied by moving the roller radially of the cam. This is accomplished by turning the threaded stud 21. It will be apparent that upon turning the stud in one direction the roller will be moved toward the periphery of the cam, thereby increasing the extent of movement of the bar 20, and upon turning the stud in the opposite direction the roller will be moved toward the center of the cam, thereby decreasing the extent of movement of the bar. A lock nut 27 is provided for securing the stud in the adjusted position.

The cam 24 is secured to a cam shaft 28 rotatably journaled in the frame members 11 and 12. The cam shaft may be driven from the winding arbor shaft 15 through a suitable train of gears 29 adapted to rotate the cam shaft at the proper speed, which determines the number of turns of wire per layer in the coils to be wound. The length of the layers, it will be seen, is determined by the extent of movement of the bar 20, which may be varied as explained above.

An arm 30 is attached at its rear end to the bar 20 and extends forwardly and downwardly toward the winding arbor. At its forward end the arm is apertured to rotatably receive a reversely bent end portion 31 of a wire guide supporting rod 32. The longer opposite end portion 33 of this rod is disposed parallel to the winding arbor and serves as a support for one or more wire guides 35. This construction permits movement of the traverse rod 32 together with the wire guides from the operative position adjacent the winding arbor to the dotted line position shown in Fig. 2 to facilitate removal of the wound coils. The traverse rod is firmly held in the operative position by means of a spring pressed pin 43 which engages a flat surface 44 on the pivot portion 31 of the rod. A pair of cotter pins 45 in the pivot portion of the rod on opposite sides of its supporting arm 30 prevent endwise movement of the rod relative to the supporting arm.

In the machine illustrated in the drawing, a plurality of wire guides 35 are provided, one for each of the coils to be simultaneously wound on the arbor. Each of the wire guides comprises a pair of fingers 36—36 in the form of metallic strips having one end formed into a resilient loop portion 37 for clamping engagement with the portion 33 of the rod 32. This portion of the rod, as best shown in Figs. 4 and 5, is approximately ¾ round in cross section, being flattened on one side, as indicated at 39. The loop portions 37 of the guide fingers have an interior surface conforming in shape to the exterior surface of rod 33 and very slightly larger so that when the fingers are positioned on the rod as shown in Fig. 5, i. e., with the flat surface 41 of the loop parallel to and adjacent the flat side 39 of the rod, the fingers are freely movable longitudinally of the rod. The diameter of the rod, however, is slightly greater than the normal dimension "A" (Fig. 5) of the loop portion 37 so that upon turning the guide finger on the rod, for example, to the position shown in Fig. 4, the resilient curved end of the loop portion is expanded and thus placed under tension, whereby it cooperates with the flat surface 41 to firmly clamp the guide finger to the rod. The usual clamping screws or bolts are thus dispensed with and the adjustment of the wire guides on the traverse rod is readily and quickly accomplished by first turning the guide fingers on the rod to the "loose" position shown in Fig. 5, then shifting the guide fingers longitudinally of the rod to the desired positions, and finally turning the fingers to the self-clamped positions, as shown in Fig. 4. It will be obvious, therefore, that the wire guides may be quickly set or reset to obtain any desired spacing of the coils on the winding arbor. Also, in a similar manner, the wire guides are readily and quickly adjustable to accommodate various sizes of wire by simply moving the cooperating guide fingers toward or away from each other after turning them to the "loose" position shown in Fig. 5.

It is believed that the operation of the machine will be clearly apparent. During the winding operation the wire guides are reciprocated longitudinally of the rotating arbor, thereby causing the supply wires 50, which are constrained to pass between the guide fingers of the respective wire guides, to be uniformly distributed in superimposed layers. The length of the layers may be quickly varied, if desired, by simply changing the position of the roller 22 on the cam 24; and the wire guides are easily and readily adjustable to accommodate various sizes of wire and to vary the spacing of the coils on the arbor.

It should be understood that the invention is not limited to the specific embodiment thereof herein illustrated and described, except as defined by the appended claims.

What is claimed is:

1. In a machine for winding strand material, the combination with a rotatable winding arbor, of means for distributing strand material on the arbor, comprising a reciprocatory member and a strand material guiding element having an integral resilient loop portion for self-clamping engagement with said member.

2. In a machine for winding strand material, the combination with a rotatable winding arbor, of means for distributing strand material on the arbor, comprising a traverse rod, and a pair of strand guiding elements mounted in spaced relation on said rod for distributing the strand on said arbor, said elements having integral resilient loop portions in yieldable clamping engagement with said traverse rod.

3. In a machine for winding strand material, the combination with a rotatable winding arbor, of means for distributing strand material on the arbor, comprising a member reciprocable longitudinally of the arbor, and a strand material guiding element having a resilient loop portion in yieldable clamping engagement with said member, said loop portion and said member having cooperating portions effective in one angular position of the element on the member for releasing the loop portion from clamping engagement with the member.

4. In a machine for winding strand material, the combination with a rotatable winding arbor, of means for distributing strand material on the arbor, comprising a traverse rod having a portion of segmented cross section, and a strand material guiding element having a resilient loop portion of a shape corresponding to said cross section of said rod portion, said loop portion and said rod portion having cooperating flat surfaces and such portions being of such cross-sectional dimensions that the loop portion is loose on said rod portion when the flat surfaces are in adjacent parallel relationship and said loop portion is in self-clamping engagement with said rod portion when said flat surfaces are in angular relationship.

5. In a machine for winding strand material, the combination with a rotatable winding arbor, of means for distributing strand material on the arbor, comprising a traverse rod having a portion of segmental cross section, and a strand material guiding element having a resilient loop portion for self-clamping engagement with said rod portion, said loop portion having a flat interior surface on one side, whereby said guiding element is freely movable endwise of said rod portion upon rotation of said element on said rod portion to an angular position in which the flat surface of the loop portion is adjacent and parallel to the flat surface of said rod portion.

6. In a machine for winding strand material, the combination with a rotatable winding arbor, of means for distributing strand material on the arbor, comprising a reciprocatory carriage, and a strand guide supporting rod having a reversely bent end portion pivoted in said carriage.

7. In a machine for winding strand material, the combination with a rotatable winding arbor, of means for distributing strand material on the arbor, comprising a reciprocatory carriage, and a traverse rod having a strand guide supporting portion disposed parallel to said arbor and a reversely bent end portion pivoted in said carriage.

FRANK MARTINDELL.